Jan. 13, 1931. J. H. REICHART 1,789,157
SELF CLEANING CORN POPPER
Original Filed Sept. 15, 1928
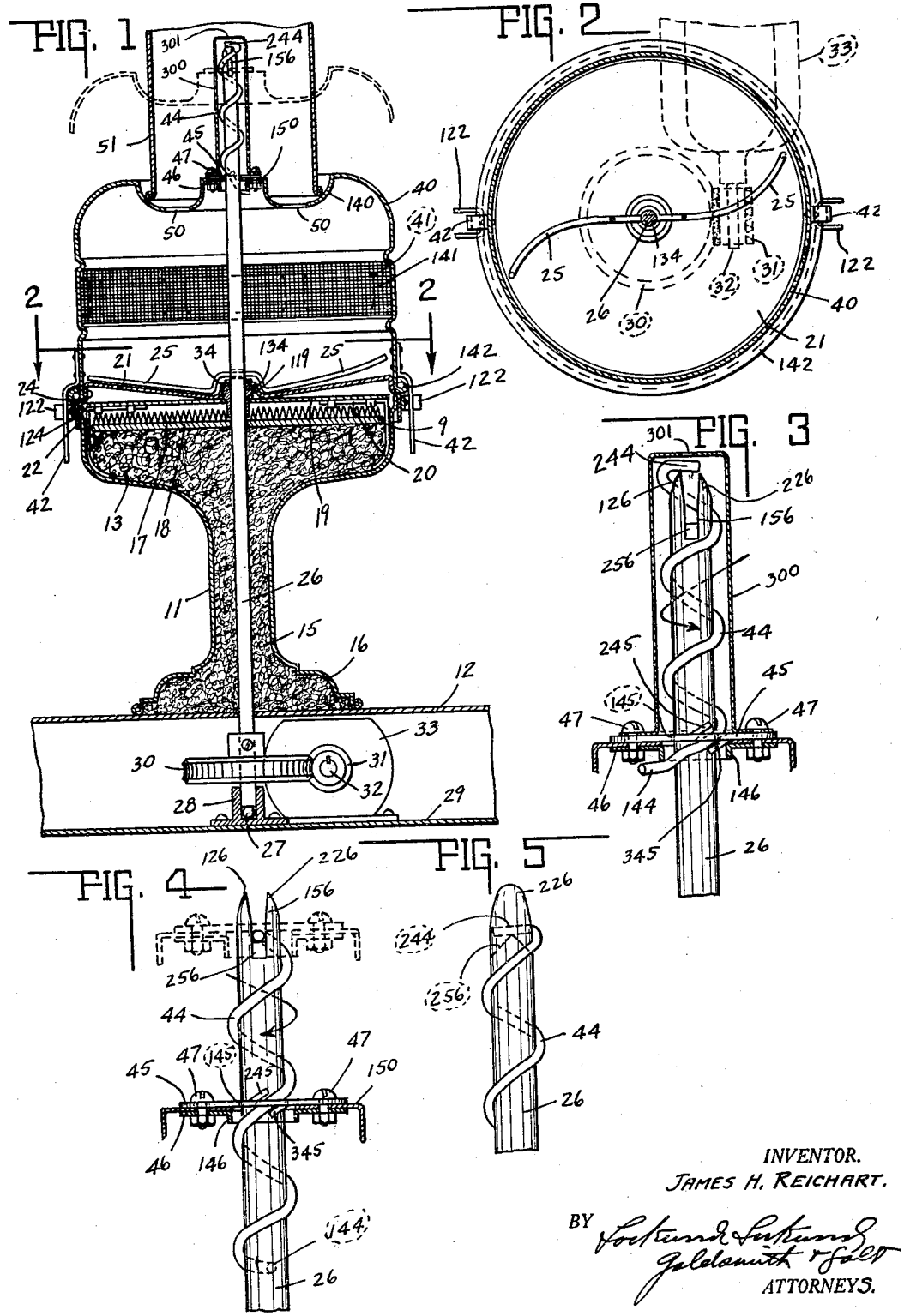
INVENTOR.
JAMES H. REICHART.
BY
ATTORNEYS.

Patented Jan. 13, 1931

1,789,157

UNITED STATES PATENT OFFICE

JAMES H. REICHART, OF MUNCIE, INDIANA

SELF-CLEANING CORN POPPER

Continuation of application Serial No. 306,175, filed September 15, 1928, Patent No. 1,752,457, dated April 1, 1930. This application filed January 30, 1930. Serial No. 424,539.

This invention relates to a corn popping machine or the like which is relatively compact and simple in construction.

The chief object of the invention is to provide a non-clogging non-sticking and self-cleaning construction suitable for apparatus such as corn poppers and the like.

Another object of the invention is to simplify the construction of a corn popper that is substantially automatic in its operation.

The chief feature of the invention resides in a reverse thread clutch and drive that is self-cleaning and that is relatively simple in construction.

One feature of the invention resides in the provision of a popping plate that slopes downwardly gradually from the margin toward the center thereof whereby the unpopped corn will tend to roll toward the central and heated portion of the plate.

Another feature is that the said popping plate is provided with a marginal flange which surrounds and is spaced from the upper part of the heating element so that any liquid like melted butter, will drip away from the same without injuring the heating element or other parts of the machine below the popping plate.

Another feature of the dished popping plate includes a centrally positioned head or elevated portion extending upwardly therefrom and surrounding the shaft for preventing grease or the like which may accumulate on the popping plate from escaping around the shaft. This arrangement eliminates the necessity of providing a packing at this point.

Another feature of the invention consists in an agitating and discharging element which is immediately above the popping plate and preferably extends angularly of and is carried by an agitating and power shaft capable of rotating in opposite directions, the agitating and discharging element comprising fingers curving reversely of each other and with one or both of the fingers bent upward somewhat from the popping plate for the purposes and advantages in operation as hereinafter set forth.

Another feature of the invention consists in providing a cover for said popping plate that is non-rotatable and vertically movable with respect to said plate by the rotation of the shaft so as to permit the discharge of the pop corn, said cover having a plurality of screened windows positioned about the side wall thereof.

This application is a continuation of the co-pending application entitled Pop corn machine Serial No. 306,175 filed September 15, 1928, now Patent No. 1,752,457 dated April 1, 1930.

The full nature of the invention will be more fully understood from the accompanying drawings and the following description and claims.

In the drawings Fig. 1 is a central sectional view of a corn popping mechanism embodying the invention, parts being shown in elevation and the dotted line indicating an elevated position of the cover. Fig. 2 is a horizontal section taken on line 2—2 of Fig. 1 and in the direction of the arrows. Fig. 3 is an enlarged elevational view of the shaft and cover connection showing the cover in lowered position and the shaft rotating in a counter-clockwise direction. Fig. 4 is a similar view of the same parts showing the shaft rotating in a clockwise direction the full lines showing the initial position prior to cover elevation and the dotted lines showing the cover in elevated position. Fig. 5 is a view similar to Fig. 4, the cover being omitted, and shows the shaft and spiral thread at right angles from that illustrated in Figs. 3 and 4.

In the drawings 12 indicates a suitable support upon which is mounted the foot 16 of a tubular standard having the neck portion 11 and the flared head portion 13. The base construction including the aforesaid includes suitable insulation material 15 which preferably is heat resisting, such as mineral wool or the like. Extending centrally through the base is a shaft 26 which at its lower end rests upon an antifriction element, such as the ball 27 retained in footing 28 supported by the plate 29. The shaft 26 between plates 12 and 29 mounts a worm wheel 30 that meshes with a worm 31 secured to a motor shaft 32 of electric motor 33. Motor 33 is reversible and a suitable control in the form of a three position switch may be provided therefor, one position obtaining in clockwise rotation of the shaft 26, another counter-clockwise rotation of shaft 26, and the third no rotation of shaft 26. In place of such a control and such a motor there may be substituted a mechanical reversing gear, a uni-directional motor and an off and on switch control therefor. Either type of arrangement is well known in power drive mechanisms and forms no part of the present invention except the application of rotational power to shaft 26 in opposite directions.

Positioned near the top of the head is an insulation plate 18 that supports a heating element 17 and positioned thereabove in spaced relation is a supporting plate 19. Struck from said plate is a plurality of pairs of straps 9 which slidably receive an angular retaining member or strap 20. The plate 19 bears against the shouldered portion 119 of a collar 134 which rotatably supports shaft 26 and also supports the head or embossed central portion 34 of the heating plate having the inwardly dished portion 21 extending outwardly and upwardly therefrom. The heating plate portion 21 at its outer end includes a down turned flange 24 that is turned outwardly and laterally as at 124 to form a seat for the bead of a cover member and the same terminates in a depending skirt 22.

The shaft 26 extends upwardly beyond the heating plate and suitably secured thereto as by extending through the same is a pair of agitators or fingers 25 one of which is slightly elevated relative to the dished portion of the heating plate and the other one practically rides over it.

The cover 40 includes an inturned portion 140 apertured at 50 and a centrally apertured plate portion 150 associated with which is a pair of clamp disks 45 and 46, the former indicating the upper and the latter the lower. Suitable means such as rivets or bolts 47 secure all in relatively rigid relation. The disks form a rotatable support for the shaft and also constitute the support for the cover by the shaft.

The cover intermediate its ends is apertured as at 41 and a suitable screen construction 141 covers the same. This permits inspection of the popper interior as well as some ventilation. The unpopped grains may be supplied through the tube or closure 51 as indicated, passing through the apertures 50. Suitably secured to the depending skirt 22 of the heating plate are a plurality of socket forming straps 122 and herein a pair of said straps is illustrated. Suitably secured to the cover and rigid therewith and depending therefrom is a plurality and a similar number of straps 42 the same constituting tongues slidably receivable by the strap sockets. The tongue and socket construction permits raising and lowering of the cover relative to the base portion but prevents relative rotation therebetween. The cover also includes a beaded portion 142 that seats or nests upon the peripheral seat formed in the heating plate.

The agitating and discharging fingers are peculiar in form. It will be noted that each finger near the shaft 26 is bent downwardly appreciably so as to rest on the popping plate near the mid-portion thereof. The fingers are curved in opposite directions, the outer ends of same extending in advance of the middle portions. One of the fingers lies rather flat on the popping plate for scraping action while the other finger is bent upward so that its extreme outer end is about ½" from the popping plate. The finger lying flat agitates the unpopped grains of corn and allows none to pass thereunder. It also prevents sticking of the popped and unpopped grains of corn to the heating plate. The other elevated finger serves to agitate the popped grains of corn.

During the popping part of the operation of the machine fingers 25 are turned counter-clockwise and the fingers serve to draw the grains toward the center of the popping plate. After a charge of corn is popped the shaft is reversed and the fingers 25 rotate in a clockwise direction which discharges the popped corn over the margin of the popping plate. This is possible because in this clockwise rotation the cover is automatically elevated as will now be set forth.

Concentric with the upper end of the shaft 26 is a spiral thread 44 the pitch being about one turn to the inch. The interior diameter of the spiral is slightly larger than the diameter of the shaft 26 so that in the relative rotation between the two when the same occurs as hereinafter set forth the spiral spring or thread will clean the rod of any accumulations of grease or the like. The lower end of the spiral spring terminates in an outwardly and substantially radially directed end 144 which serves as a stop, the same engaging the end of the inturned flange or collar 146 on the washer or plate 46. The upper end of the thread is turned inwardly and substantially diametrically as at 244 and the same is slightly inclined downwardly from the horizontal or inclined angularly to a plane transverse to the spiral axis.

The free end of the shaft 26 is slotted as at 156 and the two tongue portions projecting from the end of the shaft are tapered in partial sphere formation as at 126 and 226. Portion 126 is slightly longer than portion 226. The base of the groove or slot 156 is wedge shaped as at 256, see Fig. 5. Likewise the sides of the slot 156 are inclined outwardly.

The upper plate or disk 45 includes a central aperture 145 slightly larger than the shaft diameter, and a portion of the periphery defining said aperture is concentrically and radially slitted to form two oppositely directed tongues 245 and 345, the former being directed upwardly and the latter downwardly and lying within the collar portion 146 of the plate 46. The two tongues extend substantially parallel to each other and have the same pitch as the spiral 44 and form a track or groove for the spiral.

By reason of the peculiar formation of the aforesaid several parts the cover when lowered will remain lowered without rotating. (See tongues 42 and straps 122). The shaft at this time rotates in a counter-clockwise direction and the slightly downwardly directed end 244 of the spiral rides upon the more elevated tongue 126 of the shaft as a pivot. Upon reverse rotation the angular portion 244 of the spiral slips off of the high point of the tongue 126, drops into the shaft groove. In the clockwise rotation of the shaft the spiral rides through the groove formed by the tongues 245 and 345 and causes the cover to be elevated until the end of the spiral at the junction with the portion 244 passes from the spiral receiving groove formed by the two tongues 245 and 345. The cover remains elevated during any continued rotation of the shaft in the clockwise direction. When this occurs the agitating fingers 25 discharge the popped corn and dead grains outwardly from the center and over the edge since the mid-portion of each finger is more in advance than the end portions. The cover being elevated the popped corn and the dead grains pass out over the side of the heating plate.

Upon reversal of the motor the spiral thread automatically enters the groove formed by the two plate tongues 245 and 345 and in so doing the cover is caused to descend until the bottom or beaded portion 142 engages the offset seat of the heating plate. Thereupon the angular portion 244 of the spiral thread rises from the shaft slot and rises above the shorter tongue 226 and rests upon the higher tongue 126 where it pivots as previously set forth. The angular portion 144 serves as a stop to prevent complete withdrawal of the spiral thread from the groove in the two plates 45 and 46. This relative longitudinal movement between the spiral thread and the shaft cleans the shaft. The rotational movement also cleans the shaft. The raising and lowering movement of the cover riding up and down upon the spiral thread in its rotation by the shaft cleans the spiral thread so that sticking of the parts is continuously and positively prevented.

In Figs. 1 and 3 a protector 300 is illustrated and comprises an elongated tube anchored at one end to the nut type plate and by the bolts 47. The other end is apertured at 301 to permit lubricating of the shaft and spiral. The tubular protector prevents the corn grains from contacting the shaft and spiral, while in the reservoir 51.

The invention claimed is:

1. The combination with a member having an aperture including a coaxial threaded portion and constrained against rotation but capable of reciprocatory movement, and a reversible rotating shaft extending through an aperture of the member, of a thread on said shaft also receivable by the aperture and complementary to the threaded portion of the aperture, said thread and said shaft having an over-running clutch connection therebetween.

2. The combination with a member having an aperture including a coaxial threaded portion and constrained against rotation but capable of reciprocatory movement, and a reversible rotating shaft extending through an aperture of the member, of a thread on said shaft also receivable by the aperture and complementary to the threaded portion of the aperture, said thread and said shaft having an over-running clutch connection therebetween for one direction of shaft rotation, and an opposite over-running clutch connection therebetween upon reverse shaft rotation and when the member and the shaft have a predetermined position relative to said thread.

3. The combination with a member having an aperture including a coaxial threaded portion and constrained against rotation but capable of reciprocatory movement, and a reversible rotating shaft extending through an aperture of the member, of a thread on said shaft also receivable by the aperture and complementary to the threaded portion of the aperture and communicating therewith, said thread and said shaft having an over-running clutch connection therebetween.

4. The combination with a member having an aperture including a coaxial threaded portion and constrained against rotation but capable of reciprocatory movement, a reversible rotating shaft extending through an aperture of the member, of a thread on said shaft also receivable by the aperture and complementary to the threaded portion of the aperture, said thread and said shaft being capable of relative axial movement, and an over-running clutch connection therebetween.

5. The combination with a member having an aperture including a coaxial threaded portion and constrained against rotation but capable of reciprocatory movement, a reversible rotating shaft extending through an aperture of the member, of a thread on said shaft also receivable by the aperture and complementary to the threaded portion of the aperture and communicating therewith for cleaning the thread, said thread and said shaft being capable of coaxial relative movement for cleaning said shaft, and an over-running clutch connection between said thread and said shaft.

6. The combination with a member having an aperture including a coaxial threaded portion and constrained against rotation but capable of reciprocatory movement, a reversible rotating shaft extending through an aperture of the member, of a thread on said shaft also receivable by the aperture and complementary to the threaded portion of the aperture, said thread and said shaft having an over-running clutch connection therebetween for one direction of shaft rotation, an opposite over-running clutch connection therebetween upon reverse shaft rotation and when the member and the shaft have a predetermined position relative to said thread, and means preventing additional threading movement between the thread and member at one end of the thread, said shaft and thread having a connection therebetween preventing additional relative axial movement in the same axial direction.

7. The combination with a member having an aperture including a coaxial threaded portion and constrained against rotation but capable of reciprocatory movement, a reversible rotating shaft extending through an aperture of the member, of a thread on said shaft also receivable by the aperture and complementary to the threaded portion of the aperture, said thread and said shaft having an over-running clutch connection therebetween comprising a slotted shaft end forming tongues, and an inwardly directed diametric end of the thread extending more than half way across the thread, the exterior of the tongue portions of the shaft end being curved for free running of the thread end thereover when the shaft is rotated in one direction, the thread end being seatable in the shaft slot when the shaft is rotated in the opposite direction.

8. The combination with a member having an aperture including a coaxial threaded portion and constrained against rotation but capable of reciprocatory movement, a reversible rotating shaft extending through an aperture of the member, of a thread on said shaft also receivable by the aperture and complementary to the threaded portion of the aperture, said thread and said shaft having an over-running clutch connection therebetween, comprising a slotted shaft end forming tongues and an inwardly directed diametric end of the thread extending more than half way across the thread, the exterior of the tongue portions of the shaft end being curved for free running of the thread end thereover when the shaft is rotated in one direction, the thread end being seatable in the shaft slot when the shaft is rotated in the opposite direction, one of the shaft end tongue portions projecting slightly beyond the other and the inwardly extending thread end extending toward the body of the thread and angularly of a plane transverse to the axis thereof.

9. The combination with a member having an aperture including a coaxial threaded portion and constrained against rotation but capable of reciprocatory movement, a reversible rotating shaft extending through an aperture of the member, of a thread on said shaft also receivable by the aperture and complementary to the threaded portion of the aperture and communicating therewith for cleaning the thread, said thread and said shaft being capable of coaxial relative movement for cleaning said shaft, an over-running clutch connection between said thread and said shaft, comprising a slotted shaft end forming tongues, and an inwardly directed diametric end of the thread extending more than half way across the thread, the exterior of the tongue portions of the shaft end being curved for free running of the thread end thereover when the shaft is rotated in one direction, the thread end being seatable in the shaft slot when the shaft is rotated in the opposite direction.

10. The combination with a member having an aperture including a coaxial threaded portion and constrained against rotation but capable of reciprocatory movement, a reversible rotating shaft extending through an aperture of the member, of a thread on said shaft also receivable by the aperture and complementary to the threaded portion of the aperture and communicating therewith for cleaning the thread, said thread and said shaft being capable of coaxial relative movement for cleaning said shaft, an over-running clutch connection between said thread and said shaft, comprising a slotted shaft end forming tongues and an inwardly directed diametric end of the thread extending more than half way across the thread, the exterior of the tongue portions of the shaft end being curved for free running of the thread end thereover when the shaft is rotated in one direction, the thread end being seatable in the shaft slot when the shaft is rotated in the opposite direction, one of the shaft end tongue portions projecting slightly beyond the other and the inwardly extending thread end extending toward the body of the thread and angularly of a plane transverse to the axis thereof.

11. The combination with a member having an aperture including a coaxial threaded portion and constrained against rotation but capable of reciprocatory movement, a reversible rotating shaft extending through an aperture of the member, of a thread on said shaft also receivable by the aperture and complementary to the threaded portion of the aperture and communicating therewith for cleaning the thread, said thread and said shaft being capable of coaxial relative movement for cleaning said shaft, an over-running clutch connection between said thread and said shaft for one direction of shaft rotation, and an opposite over-running clutch connection therebetween upon reverse shaft rotation and when the member and the shaft have a predetermined position relative to said thread.

12. The combination with a member having an aperture including a coaxial threaded portion and constrained against rotation but capable of reciprocatory movement, a reversible rotating shaft extending through an aperture of the member, of a thread on said shaft also receivable by the aperture and complementary to the threaded portion of the aperture and communicating therewith for cleaning the thread, said thread and said shaft being capable of coaxial relative movement for cleaning said shaft, an over-running clutch connection between said thread and said shaft for one direction of shaft rotation, and an opposite over-running clutch connection therebetween upon reverse shaft rotation and when the member and the shaft have a predetermined position relative to said thread, said first-mentioned over-running connection comprising a slotted shaft end forming tongues, and an inwardly directed diametric end of the thread extending more than half way across the thread, the exterior of the tongue portions of the shaft end being curved for free running of the thread end thereover when the shaft is rotated in one direction, the thread end being seatable in the shaft slot when the shaft is rotated in the opposite direction.

13. The combination with a member having an aperture including a coaxial threaded portion and constrained against rotation but capable of reciprocatory movement, a reversible rotating shaft extending through an aperture of the member, of a thread on said shaft also receivable by the aperture and complementary to the threaded portion of the aperture and communicating therewith for cleaning the thread, said thread and said shaft being capable of coaxial relative movement for cleaning said shaft, an over-running clutch connection between said thread and said shaft for one direction of shaft rotation, and an opposite over-running clutch connection therebetween upon reverse shaft rotation and when the member and the shaft have a predetermined position relative to said thread, said first-mentioned over-running connection comprising a slotted shaft end forming tongues, and an inwardly directed diametric end of the thread extending more than half way across the thread, the exterior of the tongue portions of the shaft end being curved for free running of the thread end thereover when the shaft is rotated in one direction, the thread end being seatable in the shaft slot when the shaft is rotated in the opposite direction, one of the shaft end tongue portions projecting slightly beyond the other and the inwardly extending thread end extending toward the body of the thread and angularly of a plane transverse to the axis thereof.

In witness whereof, I have hereunto affixed my signature.

JAMES H. REICHART.